US012570428B2

(12) United States Patent
Fusy

(10) Patent No.: US 12,570,428 B2
(45) Date of Patent: Mar. 10, 2026

(54) SYSTEM AND METHOD FOR MOVING AND UNBUNDLING A CARTON STACK

(71) Applicant: FlexLink AB, Gothenburg (SE)

(72) Inventor: Bastien Fusy, Siccieu (FR)

(73) Assignee: FlexLink AB, Gothenburg (SE)

( * ) Notice: Subject to any disclaimer, the term of this patent is extended or adjusted under 35 U.S.C. 154(b) by 245 days.

(21) Appl. No.: 17/914,992

(22) PCT Filed: Apr. 1, 2021

(86) PCT No.: PCT/EP2021/058759

§ 371 (c)(1),
(2) Date: Sep. 27, 2022

(87) PCT Pub. No.: WO2021/198489

PCT Pub. Date: Oct. 7, 2021

(65) Prior Publication Data

US 2023/0150707 A1 May 18, 2023

(30) Foreign Application Priority Data

Apr. 3, 2020 (EP) .................................... 20315118

(51) Int. Cl.
*B65B 69/00* (2006.01)
*B25J 9/00* (2006.01)
(Continued)

(52) U.S. Cl.
CPC ......... *B65B 69/0025* (2013.01); *B25J 9/0093* (2013.01); *B25J 9/1697* (2013.01); *B25J 15/0066* (2013.01); *B25J 15/0616* (2013.01)

(58) Field of Classification Search
CPC .... B65B 69/0025; B25J 9/0093; B25J 9/1697
See application file for complete search history.

(56) References Cited

U.S. PATENT DOCUMENTS 5,970,834 A    10/1999  Garofano et al.
6,241,449 B1 *  6/2001  Krooss .................... B65B 69/00
                                                    414/419
(Continued)

FOREIGN PATENT DOCUMENTS

EP        3378806 A1    9/2018
EP        3889055 A1    10/2021
(Continued)

OTHER PUBLICATIONS

European Patent Office, Extended European Search Report received for Application No. 20315118.8, dated Oct. 2, 2020, 9 pages, Germany.

(Continued)

*Primary Examiner* — Jason Holloway
*Assistant Examiner* — Christopher A Buksa
(74) *Attorney, Agent, or Firm* — Alston & Bird LLP

(57) ABSTRACT

A system and method for moving carton stacks from a pallet to a receiving position, where the system comprises an industrial robot provided with a gripping head, where the system comprises at least one position for a pallet holding several carton stacks, a receiving position arranged to receive a carton stack in a vertical orientation, and a waste bin for receiving cut holding straps, where a carton stack is moved from a horizontal position at the pallet to a vertical position at the receiving position by the robot, where the strap is cut off by the gripping head at the receiving position, and that the strap is held by the gripping head and moved to the waste in, where the strap is released into the waste bin. The advantage of the invention is that a carton stack can be moved to a vertical position at a conveyor.

20 Claims, 6 Drawing Sheets

(51) Int. Cl.
  *B25J 9/16*       (2006.01)
  *B25J 15/00*      (2006.01)
  *B25J 15/06*      (2006.01)

(56)        References Cited

U.S. PATENT DOCUMENTS

| | | | |
|---|---|---|---|
| 2010/0074720 A1* | 3/2010 | Taylor .................. | B25J 15/0019 |
| | | | 414/412 |
| 2013/0108408 A1 | 5/2013 | Saison et al. | |
| 2014/0260115 A1 | 9/2014 | Mayhall, III et al. | |
| 2017/0001741 A1 | 1/2017 | Gautheron | |
| 2020/0156813 A1 | 5/2020 | Wipf | |

FOREIGN PATENT DOCUMENTS

| | | | |
|---|---|---|---|
| FR | 2957905 A1 | 9/2011 | |
| FR | 3060538 A1 | 6/2018 | |
| WO | WO 2019/243674 A1 | 12/2019 | |

OTHER PUBLICATIONS

International Searching Authority, International Search Report and Written Opinion received for International Application No. PCT/EP2021/058759, dated Jun. 20, 2021, 11 pages, European Patent Office, Netherlands.
Third Party Observation for European Application No. 20200315118, submitted to European Patent Office, Munich, Germany, October 20, 2025, 10 pages.
Third Party Correspondence for U.S. Appl. No. 17/914,992 submitted Dec. 5, 2025, 8 pages.

\* cited by examiner

SYSTEM AND METHOD FOR MOVING AND UNBUNDLING A CARTON STACK

CROSS REFERENCE TO RELATED APPLICATIONS

This application is a National Stage Application, filed under 35 U.S.C. § 371, of International Application No. PCT/EP2021/058759, filed Apr. 1, 2021, which claims priority to European Application No. 20315118.8, filed Apr. 3, 2020; the contents of both of which as are hereby incorporated by reference in their entireties.

BACKGROUND

Related Field

The present invention relates to a method and a system for picking up and unbundling carton stacks.

DESCRIPTION OF RELATED ART

Robots are often used for loading and unloading operations in the industry. Various types of products and objects can be handled by a robot. The products may be regular or irregular, and the size of an object may vary considerably. The robots can assemble products or they can be used to pack and stack the products. One common use for a robot is to move objects to a pallet in order to pack the pallet at the end of a production line. At the end of a production line, the products are often stored in regular boxes that will simplify the packing of products on a pallet. However, some products or product packages are shaped such that they can be packed on a pallet without the need to first pack them in a box. An example of such a product is a package containing a plurality of paper rolls, which is possible to pack on a pallet.

Another common use is to move products from a pallet onto a conveyor line at the beginning of a production line. One common product that is moved to a conveyor is flat-folded cartons or other flat sheet-like objects. These are often delivered in bundles wrapped together with a holding strap. Such a bundle must be moved from a pallet to an infeed station and the strap must be removed.

WO 2019/243674 A1 describes one way of transferring printed matter from a pallet to an entry section of a processing line. A vision system detects one side of the bundle and the position of the strap. A grasping member is positioned on top of the bundle, and the bundle is lifted in the strap by blades of the grasping member. The bundle is positioned in the entry section and the strap is cut by a cutting member and disposed of in a waste basket.

Such a system work well for some types of products, but there is still room for an improved system and method for moving carton bundles.

Brief Summary

An object of the invention is therefore to provide an improved system for moving and unbundling carton stacks. Another object of the invention is to provide an improved method for moving and unbundling carton stacks.

The solution to the problem according to the invention is described in the characterizing part of claim 1 with regard to the system and in claim 10 regarding the method. The other claims contain advantageous embodiments and further developments of the system and method.

In a system for moving carton stacks from a pallet to a receiving position, where a stack is held together by a strap, where the receiving position comprises at least one carton support adapted to support the carton stack in a vertical position, where the system comprises an industrial robot provided with a gripping head, where the gripping head comprises a cutting module provided with a cutting means, where the system comprises at least one position for a pallet holding several carton stacks, a receiving position arranged to receive a carton stack in a vertical orientation, where the conveyor comprises at least one carton support adapted to support the carton stack in the vertical position, and a waste bin for receiving cut holding straps, the object of the invention is achieved in that the gripping head comprises an optical detection means adapted to detect the position of a print on a carton such that the orientation of the carton stack and the position of a strap can be determined, where the robot is arranged to move a carton stack from a horizontal position at the pallet to the vertical position at the receiving position, where the cutting means is arranged to cut off the strap at the receiving position, and that the gripping head is arranged to hold the cut strap and to be moved to the waste bin, where the gripping head is arranged to release the strap into the waste bin.

By this first embodiment of the system according to the invention, a system that allows horizontal carton stacks to be picked up and transferred to a vertical position, in which the strap holding the carton stack together is cut off and disposed of. The system is suitable for larger flat-folded cartons and other flat objects that are held together in a stack by a holding strap made of a plastic material. The size of such an object may be e.g. 30 cm*50 cm or more, and the number of objects in a stack may be e.g. 10-50 objects. The flat objects must be relatively rigid, since the complete stack is lifted by the upper object and the rest of the stack is lifted in the strap through the upper object. By positioning the carton stacks in a vertical position at a receiving position of e.g. a conveyor, the further handling of the cartons is simplified since the cartons can be forwarded in the proper orientation.

The orientation of the carton stack on the pallet is first detected, such that the carton stack can be positioned in the proper orientation at the receiving position. This will give the erected carton the proper orientation with regard to e.g. printing on the carton. The orientation of the carton is used to detect the position of the holding strap, which is applied with a specific tolerance. It is possible to use only the orientation of the carton to determine the position of the strap, or the position of the strap can also be detected by a detector. It is further possible to detect the presence of a strap with a strap detector. When the position of the strap is detected, the gripping head is positioned on the upper surface of the carton stack in a predefined position, such that a cutting means of the gripping head is positioned adjacent the strap.

The carton stack is lifted by the use of vacuum cups of the gripping head. By using vacuum cups, the carton stack can be lifted and moved in any direction and with any orientation. In this way, the carton stack can be placed in a vertical receiving position with a proper orientation. The carton stack is during the movement to the receiving position tilted to a more or less vertical orientation, and may at the same time be rotated such that the orientation of the printing of the carton stack is correct.

When the carton stack is placed at the receiving position and is standing still, the cutting module is moved from a start position adjacent the strap to a cutting position in which the cutting means of the trimming module encloses the strap. In this position, a lower blade and an upper blade of the cutting means is positioned on each side of the strap. A cutting actuator moves the blades with the cutting edges towards each other such that the strap is cut off. At the same time, a holding means is lowered towards the lower blade. The holding means will clamp the strap between the holding surface and the lower blade such that the strap is held securely by the holding means. Thereafter, the gripping head releases the carton stack and moves to a waste bin, where the strap is released.

The gripping head comprises a plurality of vacuum cups, a trimming module provided with a cutting means and an optical detection means. The cutting module of the trimming module is adapted to move from a start position in which the cutting means is positioned adjacent the strap to a cutting position in which the strap is embraced by the cutting means, with lower blade and an upper blade arranged on each side of the strap. The trimming module further comprises a holding means adapted to hold the strap when the cutting module has cut the strap. Since the gripping head will move a carton stack to a receiving position, unbundle the carton stack and move the cut strap to a waste bin, there is no need for an operator to constantly monitor or oversee the operation of the system.

In a method for moving a carton stack from a pallet to a receiving position and to cut a strap holding the carton stack together, the steps of: detecting the position of a print on a carton with an optical detection means such that the orientation of the carton stack can be determined, determining the position of the strap from the detected position of the print on the carton, positioning a gripping head in a predefined position relative the strap, lifting the carton stack with a plurality of vacuum cups arranged on the gripping head, placing the carton stack in a vertical position at the receiving position, moving a cutting module provided in the gripping head from a start position to a cutting position in which the cutting module embraces the strap, cutting the strap with the cutting module, holding the strap with a holding means arranged on the gripping head, moving the gripping head to a waste basket, and releasing the strap in the waste basket are disclosed.

By this first embodiment of the method according to the invention, a simplified way of moving and unbundling a carton stack is provided. By the method, a carton stack is moved from a horizontal position to a vertical position, and is unbundled at the vertical position.

BRIEF DESCRIPTION OF THE FIGURES

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims. In the described example, an example of moving a stack of folded cartons from a pallet is described. The method and system may as well be used for other flat objects held together by a holding strap. Reference to directions such as vertical, horizontal etc. are related to normal earth plane directions, i.e. the floor of a production plant is horizontal.

Figure 1:
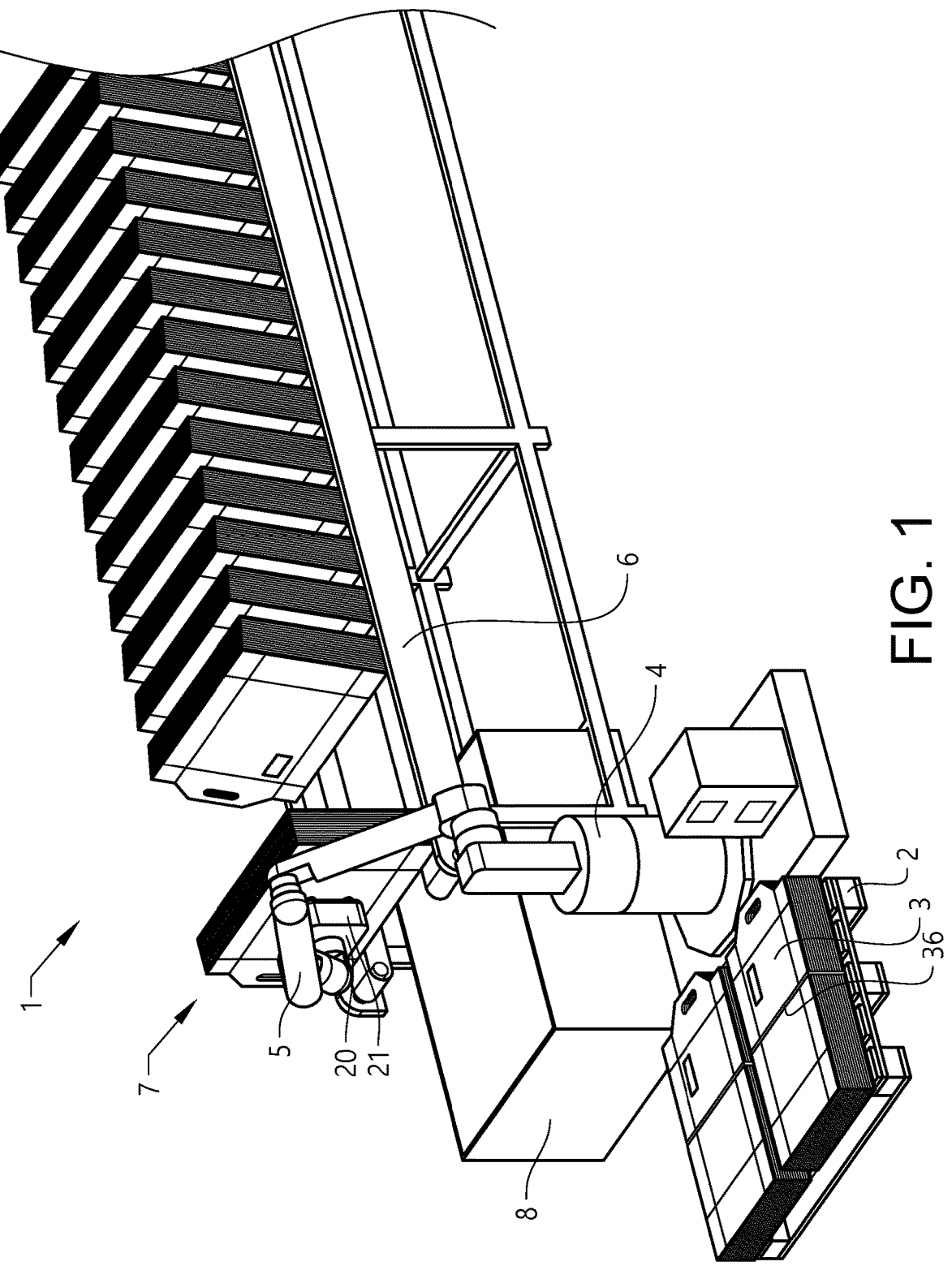
FIG. 1 shows a schematic view of a system according to the invention.
Figure 2:
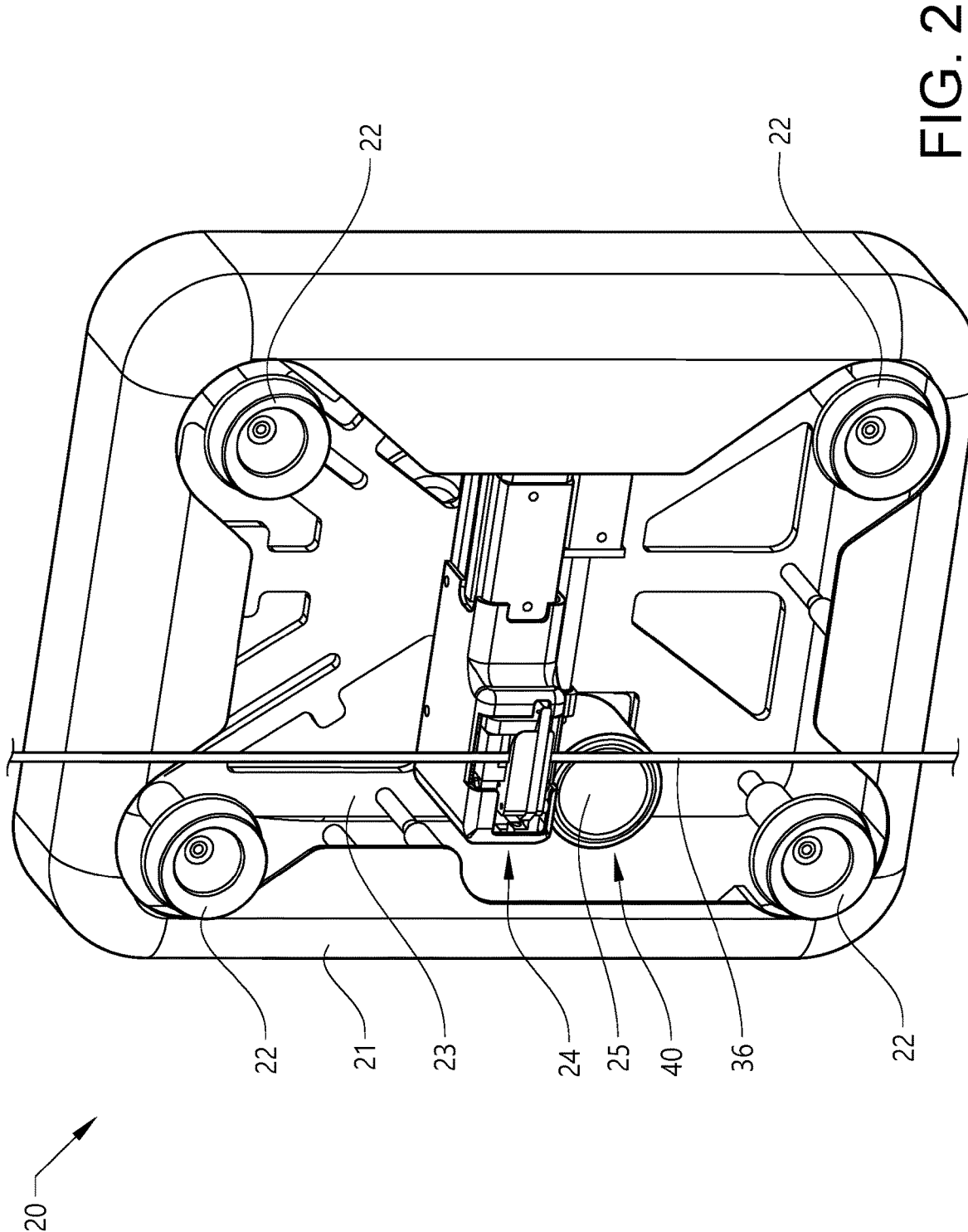
FIG. 2 shows an example of a gripping head used in the system according to the invention.

FIG. 1 shows a system according to the invention, and FIG. 2 shows a gripping head used in the system. The system 1 comprises a robot 4 provided with a gripping head 20. The robot may be a standard industrial robot having a multi axle robot arm 5 that can be moved in any direction, and is in the described example a collaborate robot that does not require a protection cage. The arm is provided with a gripping head 20 that is adapted to pick up and move a carton stack by using vacuum cups 22. The gripping head is provided with a safety shroud 21 that will detect if the gripping head hits something and will in this case stop the robot. The robot is arranged at one end of a conveyor 6, which is adapted to transport the cartons from a vertical position at a receiving position 7 to a carton handling station, e.g. a carton erecting station at the other end of the conveyor. The carton stacks are arranged in a horizontal direction on a pallet 2 arranged beside the robot and the conveyor. The system may be provided with one or more pallets from which the robot can pick up carton stacks. The pallets are positioned at specific, predefined positions such that the system does not have to identify the exact position of a pallet. With two pallets, there will be no interruption when a pallet is empty and needs to be exchanged.

In the shown example, the robot is adapted to move a carton stack 3 from a pallet 2 to a vertical receiving position 7 at one end of a conveyor 6. A carton is provided with a print of some sort, e.g. a logotype that is arranged on the upper side of a carton, such that it is visible from above. The gripping head 20 will detect the print with an optical detection means 40, e.g. a vision system comprising a camera 25. When the print is detected, the system can determine the orientation of the carton stack. The actual orientation of the carton stack is important e.g. when the cartons are to be fed to a carton erecting station, such that the folded cartons are erected with the proper orientation. From the position of the print on the carton, the position of the strap 36 holding the carton stack together can also be determined, since the strap is applied to the carton stack in a known manner with a known tolerance.

The gripping head 20 is positioned on the carton stack by the robot such that the cutting module 28 of the trimming module 24 is positioned on one side of the strap 36, in a start position 37. The trimming module 24 is arranged on the frame 23 of the gripping head, and is in one example arranged with a resilient suspension such that the trimming module is spring-loaded in a vertical direction. The trimming module extends out from the gripping plane of the gripping head, i.e. below the vacuum cups 22 and the safety shroud 21 of the gripping head, when the gripping head is empty, and will bear on the upper carton in a carton stack when the gripping head is arranged on the carton stack. The resilient suspension assures that the lower blade 30 of the cutting module will be in contact with the upper carton. In the shown example, the lower blade 30 is provided with a spring-loaded catch finger 26 that is adapted to bear against the upper carton in a carton stack, even if the carton is not totally flat or if the lower blade 30 is positioned slightly above the upper carton. In this way, a strap will always be caught by the lower blade, even when the lower blade is not in contact with the upper carton or when the upper carton is somewhat warped. The catch finger can catch the strap such that it can slide up on the lower blade when the cutting module moves from the start position to the cutting position.

When the gripping head bears on the upper carton of the carton stack, the vacuum cups are engaged by an under pressure source arranged at the robot. The vacuum cups will attach the gripping head to the carton stack such that the carton stack can be lifted and manipulated by the robot. The vacuum cups will hold the uppermost carton and the strap holds the complete stack together. By lifting a carton stack in this way, the cartons must be relatively stiff since most of the cartons are held only by the strap. The gripping head is thus not suitable for lifting soft or flexible products, even if they are held together by a strap. The surface of the carton must also be relatively flat, such that the vacuum cups can get a good grip.

Figure 3:
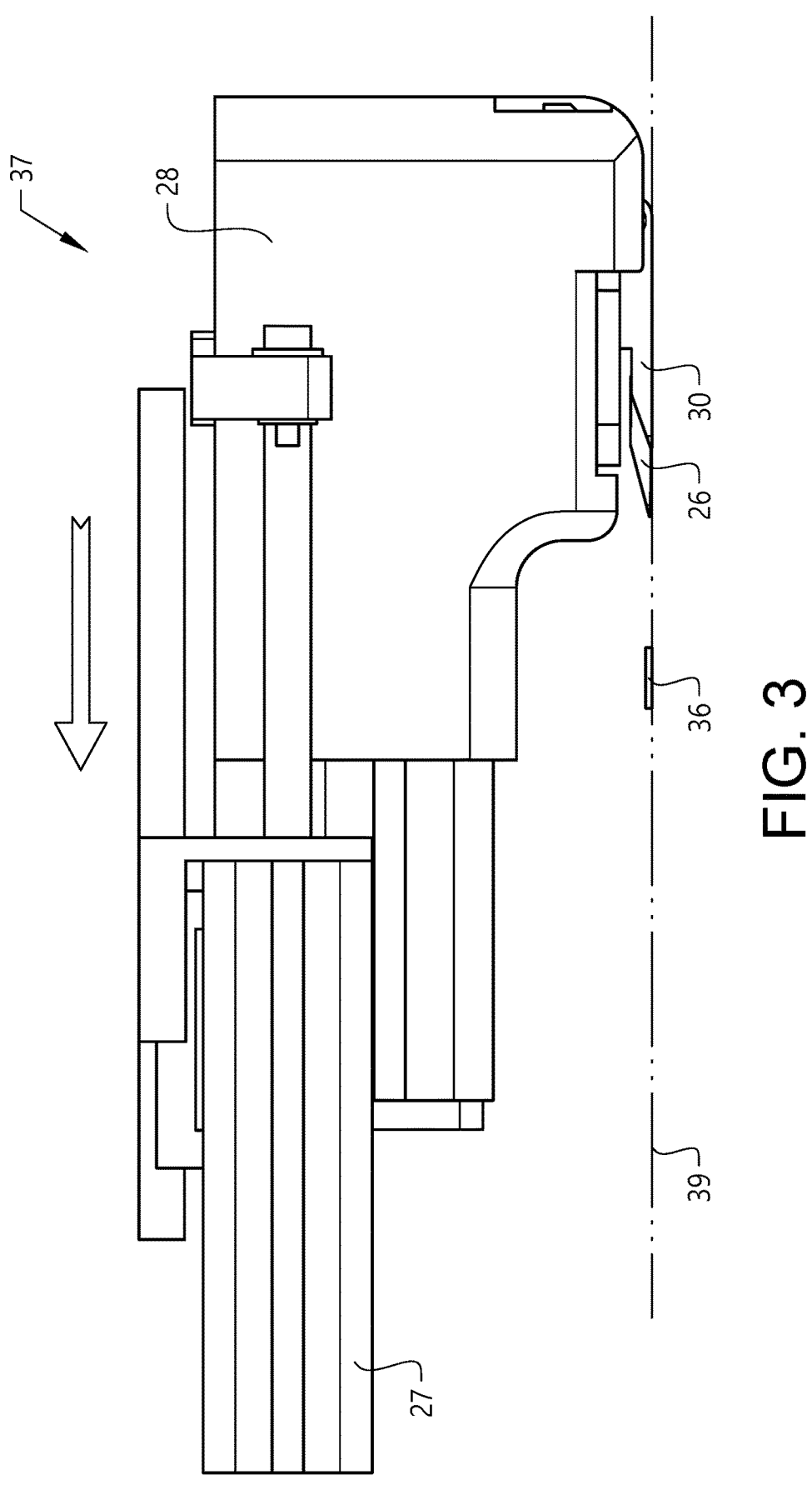
FIG. 3 shows an example of a trimming module in a start position.
Figure 4:
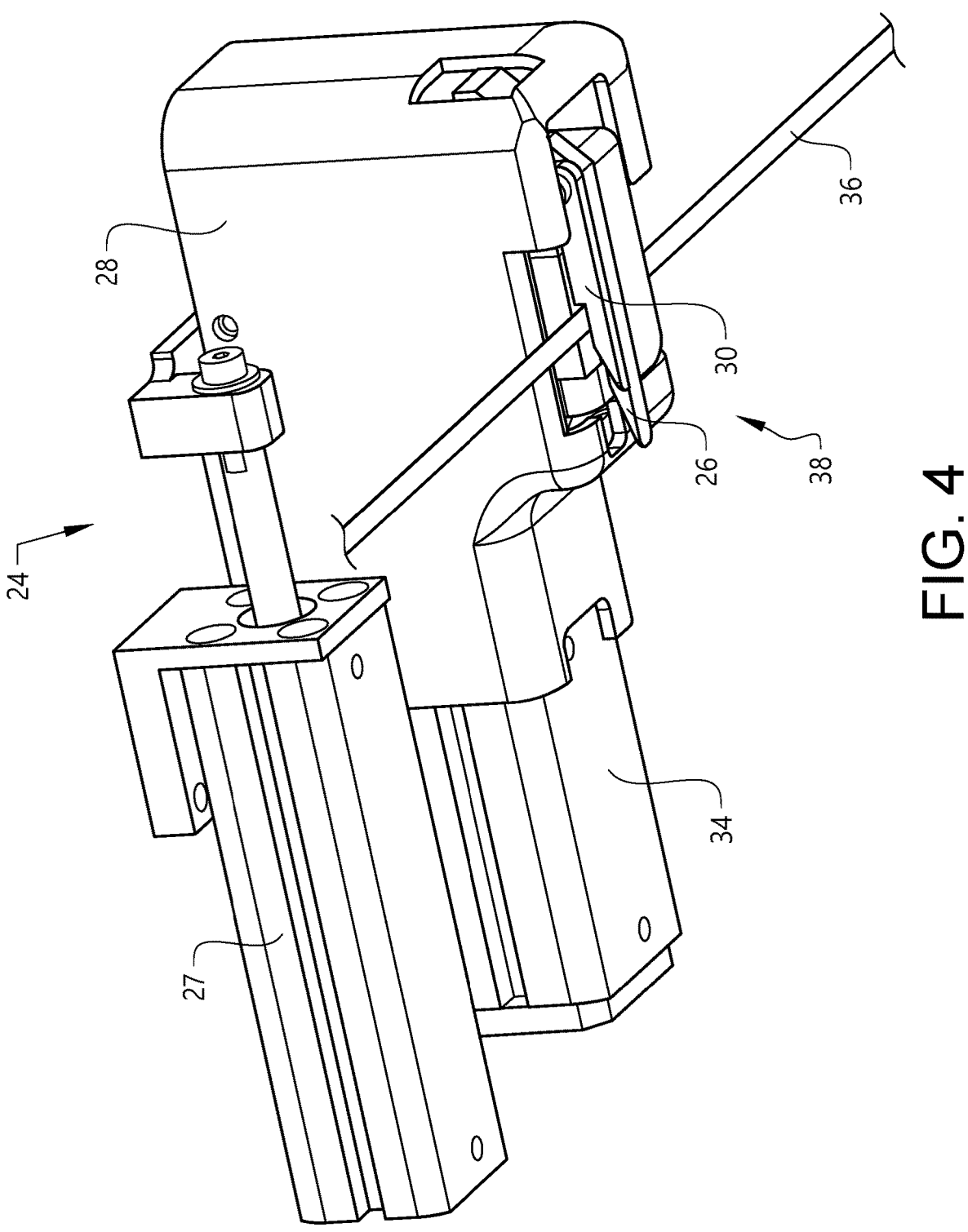
FIG. 4 shows the trimming module in a cutting position.

When the gripping head is attached to the carton stack, the cutting module 28 of the trimming module 24 is moved from the start position 37, as shown in FIG. 3, to the cutting position 38, as shown in FIG. 4. The catch finger 26 and the lower blade 30 of the cutting module are bevelled at the front, such that they will easily slide under the strap when the cutting module is moved towards the cutting position, even if the upper carton is not totally flat. In the cutting position, the strap 36 is enclosed by the cutting module 28, where the lower blade 30 with a lower edge 32 is positioned under the strap, and where the upper blade 31 with an upper edge 33 is positioned above the strap.

The gripping head 20 may also be provided with a strap detector (not shown), which in one example may be a photoelectric sensor that will detect the position of the strap. The photoelectric sensor can be used to determine the position of the strap, which may be helpful for fine adjustment of the gripping head before the gripping head is positioned on the carton stack. The photoelectric sensor may also be used to ensure that the carton stack is provided with a strap. Since the strap is applied to a carton stack in a predictable manner, at the same position for every carton stack, the strap detector is optional.

In the described example, the cutting module is moved from the start position to the cutting position before the carton stack is lifted. It is also possible to move the cutting module to the cutting position when the carton stack is positioned at the receiving position 7.

The trimming module 24 is provided with a linear actuator 27 on which the cutting module 28 is mounted. The linear actuator will move the cutting module from the start position 37 to the cutting position 38. The cutting position may be a fixed position corresponding to the end position of the linear actuator. The cutting module may also be provided with a detector, e.g. a micro switch, which detects when the cutting module has reached the strap and stops the linear actuator.

Figure 5B:
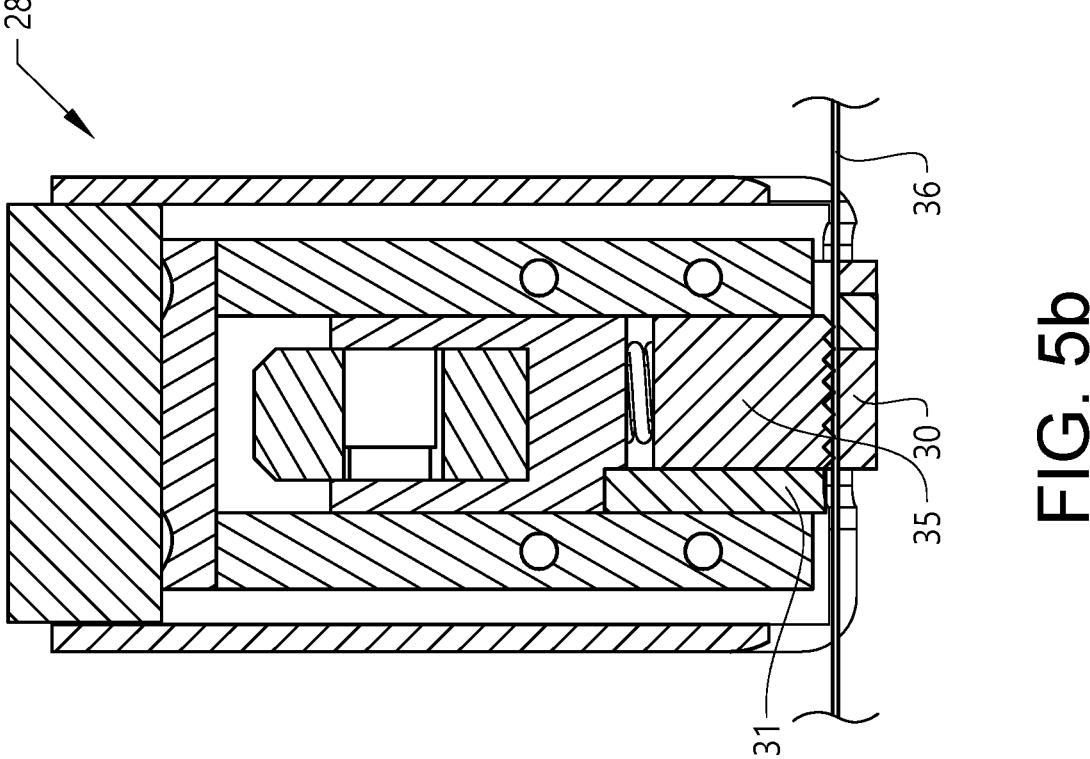
FIGS. 5a-5c show details of the trimming module in cut views.
Figure 5A:
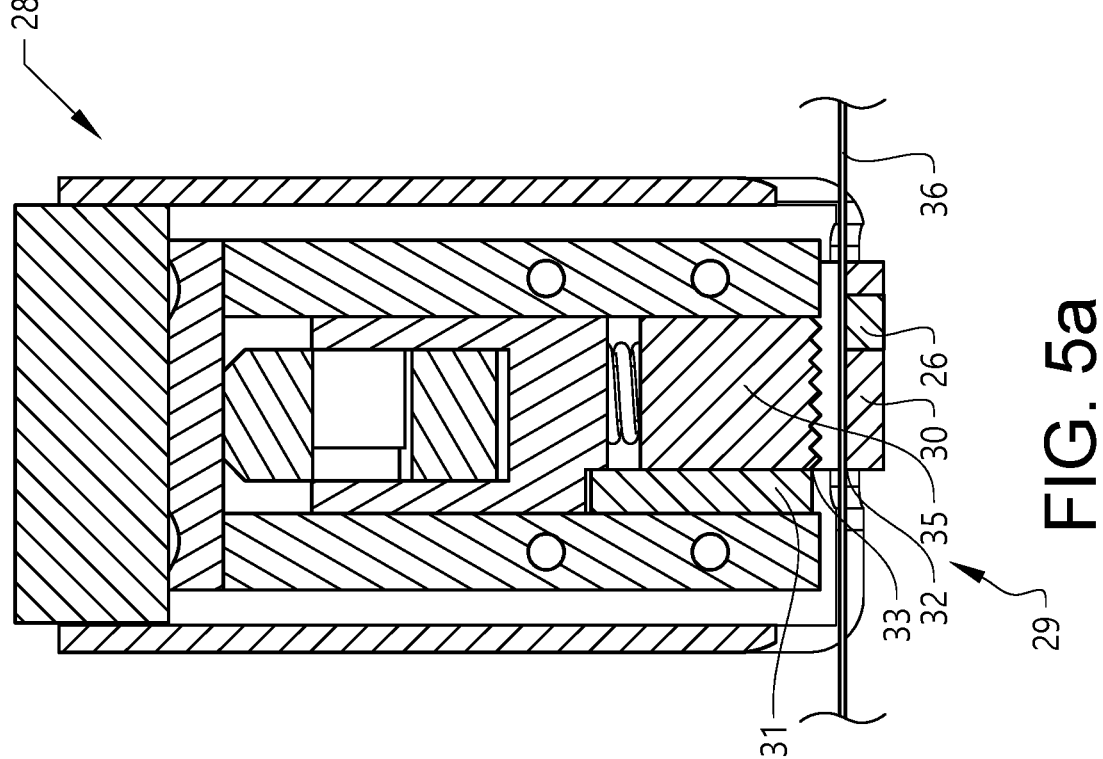
Figure 6:
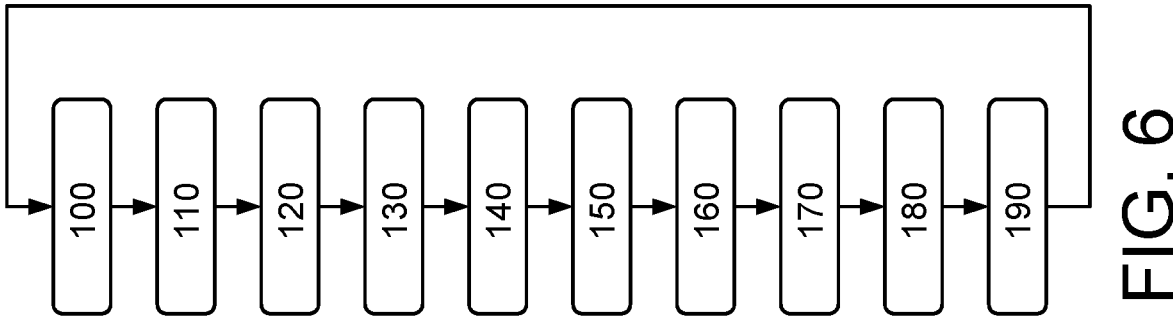
FIG. 6 shows a flow chart of an example of a method according to the invention.
Figure 5C:
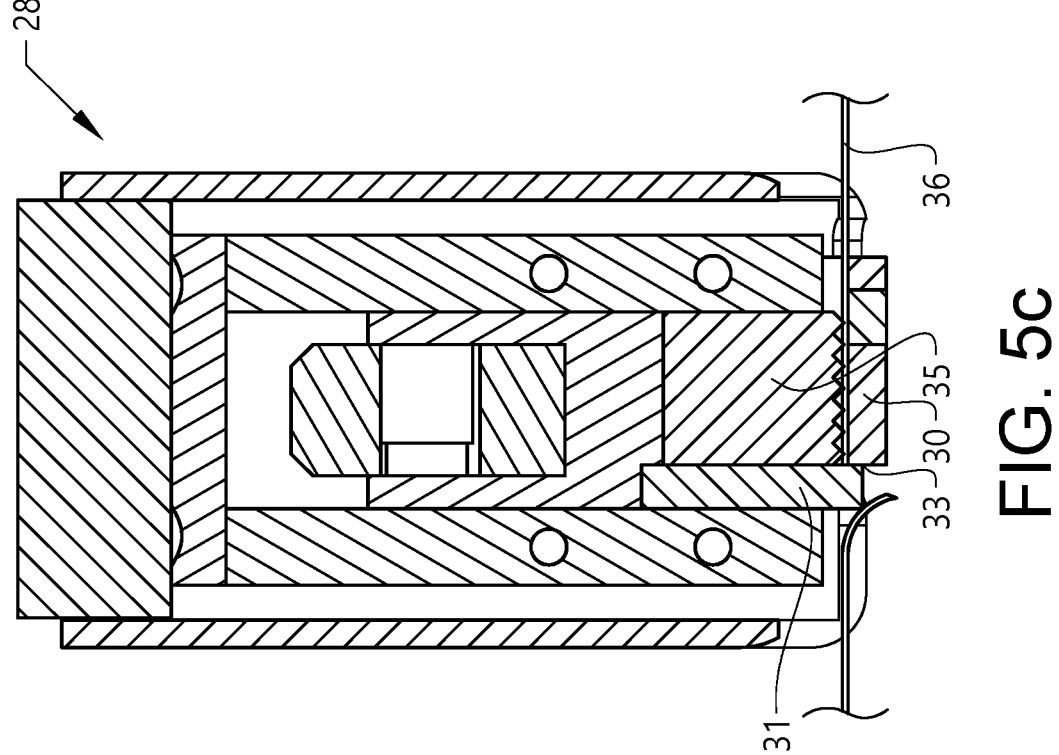

When the carton stack is held by the gripping head, the carton stack is lifted and moved to the receiving position 7 at the conveyor 6. Depending on the orientation of the carton stack on the pallet, the carton stack may also be rotated such that the carton stack is positioned at the receiving position with the correct orientation with regards to the print on the cartons. When the carton stack is bearing on the conveyor at the receiving position, the strap can be cut by a cutting means comprising an upper blade 31 and a lower blade 30. The strap is cut off by engaging a cutting actuator 34 of the cutting module 28, as is shown in FIGS. 5a-5c. The cutting actuator will move the upper blade 31 provided with an upper edge 33 towards the lower blade 30 provided with a lower edge 32 such that the edges perform a cutting action.

Since the system with the gripping head is a collaborative system where a human may work in the reach area of the robot arm, it is important that there is no sharp or pointed edges at the cutting module. The edges are thus not sharp or pointed, but are two 90 degrees edges that cut the strap when the blades pass each other.

At the same time, a holding means 35 arranged at the cutting means, together with the upper blade, will move towards the lower blade and will clamp the strap between the holding means and the lower blade, as shown in FIG. 5b. The strap is now securely held by the cutting module. The holding means may e.g. comprise a pointed pattern or a protruding part that cooperates with a recess in the lower blade. The holding means is preferably spring-loaded such that it will be able to grip a strap in a secure way regardless of the thickness of the strap. When the holding means bears on the strap, the upper blade of the cutting means continues downwards and cuts off the strap, as shown in FIG. 5c. The strap is now cut off and is securely held in the gripping head by the holding means.

In the shown example, the conveyor comprises two spaced apart conveyor belts, such that the centre of the conveyor is open. This will simplify the removal of a strap that is positioned in a vertical direction of the carton stack at the receiving position. Since the conveyor is open at the centre, the carton stack will not stand on the strap, and the strap can easily be removed. The strap may also be positioned in a horizontal direction, in which case also a closed conveyor belt may be used. The conveyor is provided with a vertical carton support that will support the carton stack. The conveyor may also be provided with additional grippers that hold the carton stack. The orientation of the carton stack at the receiving position is substantially vertical, i.e. the cartons are arranged with an angle between 70-90 degrees with respect to a horizontal plane.

The carton stack is released from the gripping head by evacuating the under pressure from the vacuum cups. The robot moves the gripping head from the receiving position to a position above a waste bin, where the strap is released from the trimming module by returning the cutting actuator to its idle position. The strap falls down into the waste bin and the gripping head is ready to pick up a new carton stack.

The system is further provided with a control unit adapted to control the movement of the robot and the gripping head. The control unit is preferably connected to the control system for the complete manufacturing system including the conveyor system. In this way, the robot can move carton stacks to the receiving position when needed. The control unit can also adapt the system to different types of cartons, e.g. having different sizes or different printing.

A further advantage of the system is that the gripper head can also be used to remove interposing sheets or liners arranged between different layers of carton stacks. A liner can easily be picked up and placed in a vertical direction on a pallet next to the pallet with the carton stacks.

In the method for moving a carton stack from a pallet to a receiving station and to unbundle the carton stack, the following steps are comprised.

In a first step 100, the position of the print on the carton is detected with an optical detection means. From the position of the print, the orientation of the carton pack can be determined. The optical detection means may e.g. comprise a vision system having a camera that will detect the position and orientation of a print on a carton.

In a second step 110, the position of the strap holding the carton stack together is determined from the detected position of the print on the carton. The position of the strap may be estimated from the position of the print, since the strap is applied to a carton stack in the same position for all carton stacks, or the position of the strap may be detected individually by the optical detection means.

In step 120, the gripping head is positioned on the upper carton in a carton stack in a predefined position relative the strap. In this position, the cutting module of the trimming module is positioned on one side of the strap, adjacent the strap.

In step 130, the carton stack is lifted by using a plurality of vacuum cups arranged on the gripping head. The gripper head lift the upper carton of the carton stack, and the rest of the cartons in the carton stack follows the upper carton due to the strap holding the carton stack together.

In step 140, the carton stack is placed in a vertical position at the receiving position. The carton stack may be placed with the strap in a vertical direction or in a horizontal direction.

In step 150, the cutting module is moved from a start position to a cutting position in which the cutting means of the cutting module embraces the strap. In this position, the lower blade with a lower edge will be positioned under the strap, and the upper blade with an upper edge will be positioned above the strap. This step may also be performed after the gripping head has attached to the carton stack, but before the carton stack is lifted.

In step 160, the strap is cut with the cutting module, by moving the upper blade with the upper edge towards the lower blade with the lower edge by the use of a cutting actuator. At the same time, a holding means is moved downwards towards the lower blade. The holding means is arranged adjacent the upper blade.

In step 170, the strap is held by the holding means arranged on the cutting module. The holding means will clamp the strap between the holding means and the lower blade in a secure way.

In step 180, the gripping head is moved away from the receiving position to a position above a waste bin.

In step 190, the strap is released into the waste bin by returning the cutting actuator to its idle state, such that the holding means releases the grip of the strap. The gripping head can now return to the pallet to pick up a new carton stack.

A further step that may be included, depending on how the position of the strap is detected. If the position of the strap is determined only by using the position of the print, it may be of advantage to detect if a carton pack comprises a strap. The presence of a strap may be detected by an optical detector, e.g. a photoelectric sensor, which detects the presence of a strap. This sensor may be used to detect the presence of a strap, or if the strap is misaligned. If the strap is misaligned, the holding position of the gripper head may be adjusted such that the gripper head is aligned correctly with regards to the strap.

The invention is not to be regarded as being limited to the embodiments described above, a number of additional variants and modifications being possible within the scope of the subsequent patent claims.

REFERENCE SIGNS

1: System
2: Pallet
3: Carton stack
4: Robot
5: Robot arm
6: Conveyor

7: Receiving position
8: Waste bin
20: Gripping head
21: Safety shroud
22: Vacuum cup
23: Frame
24: Trimming module
25: Vision system
26: Catch finger
27: Linear actuator
28: Cutting module
29: Cutting means
30: Lower blade
31: Upper blade
32: Lower edge
33: Upper edge
34: Cutting actuator
35: Holding means
36: Strap
37: Start position
38: Cutting position
39: Gripping plane
40: Optical detection means

The invention claimed is:

1. A system (1) for moving carton stacks (3) from a pallet (2) to a receiving position (7), where each of the carton stacks (3) is held together by a strap (36), where the receiving position (7) comprises at least one carton support adapted to support the carton stacks (3) in a vertical position, the system comprising:

an industrial robot (4) provided with a gripping head (20), where the gripping head (20) comprises a cutting module (28) provided with a cutting means (29), at least one position for a pallet (2) holding several of the carton stacks (3), where the receiving position (7) is arranged to receive each of the carton stacks (3) in a vertical orientation, and a waste bin (8), wherein:

the gripping head (20) comprises an optical detection means (40) adapted to detect the position of a print on a carton such that the orientation of each of the carton stacks (3) and the position of a strap (36) can be determined, the robot (4) is arranged to move at least one of the carton stacks (3) from a horizontal position at the pallet (2) to the vertical position at the receiving position (7), such that during the movement to the receiving position (7) the at least one of the carton stacks (3) is tilted from the horizontal position to the vertical position, the cutting means (29) is arranged to cut off the strap (36) at the receiving position (7), and the gripping head (20) is arranged to hold the strap (36) and to be moved to the waste bin (8), where the gripping head (20) is arranged to release the strap (36) into the waste bin (8).

2. The system according to claim 1, wherein the receiving position (7) is arranged at one end of a conveyor (6).

3. The system according to claim 2, wherein the gripping head (20) comprises a plurality of vacuum cups (22), and that the cutting module (28) is adapted to move from a start position (37) to a cutting position (38) in which the strap (36) is embraced by the cutting module (24), and where a holding means (35) is adapted to hold the strap (36) when the cutting module (24) has cut the strap (36).

4. The system according to claim 1, wherein the gripping head (20) comprises a plurality of vacuum cups (22), and that the cutting module (28) is adapted to move from a start position (37) to a cutting position (38) in which the strap (36) is embraced by the cutting module (24), and where a holding means (35) is adapted to hold the strap (36) when the cutting module (24) has cut the strap (36).

5. The system according to claim 4, wherein the cutting means (29) and the holding means (35) are arranged adjacent each other.

6. The system according to claim 5, wherein the cutting means (29) and the holding means (35) are actuated with a single actuator (34).

7. The system according to claim 4, wherein the cutting means (29) and the holding means (35) are actuated with a single actuator (34).

8. The system according to claim 4, wherein the optical detection means (40) comprises either a camera (25) or a photoelectric sensor adapted to detect the presence of a strap (36).

9. The system according to claim 8, wherein at least one of the carton stacks (3) is placed at the receiving position (7) with the strap in a vertical orientation.

10. The system according to claim 8, wherein at least one of the carton stacks (3) is placed at the receiving position (7) with the strap in a horizontal orientation.

11. The system according to claim 4, wherein at least one of the carton stacks (3) is placed at the receiving position (7) with the strap in a vertical orientation.

12. The system according to claim 4, wherein at least one of the carton stacks (3) is placed at the receiving position (7) with the strap in a horizontal orientation.

13. The system according to claim 1, wherein the optical detection means (40) comprises a camera (25).

14. The system according to claim 1, wherein the optical detection means (40) comprises a photoelectric sensor adapted to detect the presence of a strap (36).

15. The system according to claim 1, wherein at least one of the carton stacks (3) is placed at the receiving position (7) with the strap in a vertical orientation.

16. The system according to claim 1, wherein at least one of the carton stacks (3) is placed at the receiving position (7) with the strap in a horizontal orientation.

17. A method for moving a carton stack from a pallet to a receiving position and to cut a strap holding the carton stack together, said method comprising the steps of:
    detecting the position of a print on a carton with an optical detection means such that the orientation of the carton stack can be determined,
    determining the position of the strap from the detected position of the print on the carton,
    positioning a gripping head in a predefined position relative the strap,
    lifting the carton stack with a plurality of vacuum cups arranged on the gripping head,
    placing the carton stack in a vertical position at the receiving position, wherein during the movement to the receiving position (7) the carton stack (3) is tilted from a horizontal position to the vertical position,
    moving a cutting module provided in the gripping head from a start position to a cutting position in which the cutting module embraces the strap,
    cutting the strap with the cutting module,
    holding the strap with a holding means arranged on the gripping head,
    moving the gripping head to a waste bin, and
    releasing the strap in the waste bin.

18. The method according to claim 17, wherein the method further comprises the step of: detecting the presence of a strap with a strap detector when the cutting module is in the cutting position.

19. The method according to claim 17, wherein the method further comprises the step of: removing interposing sheets or liners arranged between layers of carton stacks, and to place the sheet or liner in a vertical direction on a pallet next to the pallet with the carton stacks.

20. The method according to claim 18, wherein the method further comprises the step of: removing interposing sheets or liners arranged between layers of carton stacks, and to place the sheet or liner in a vertical direction on a pallet next to the pallet with the carton stacks.

* * * * *